United States Patent
Shilo et al.

(10) Patent No.: US 12,244,444 B2
(45) Date of Patent: Mar. 4, 2025

(54) METHOD AND APPARATUS FOR REDUCING A PEAK TO AVERAGE POWER RATIO IN THE TRANSMISSION OF PHYSICAL LAYER PROTOCOL DATA UNITS

(71) Applicant: HUAWEI TECHNOLOGIES CO., LTD., Shenzhen (CN)

(72) Inventors: Shimon Shilo, Hod Hasharon (IL); Oded Redlich, Hod Hasharon (IL); Genadiy Tsodik, Hod Hasharon (IL); Jian Yu, Shenzhen (CN); Ming Gan, Shenzhen (CN); Ezer Melzer, Hod Hasharon (IL); Doron Ezri, Hod Hasharon (IL); Yoav Levinbook, Hod Hasharon (IL); Mengshi Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/324,714

(22) Filed: May 26, 2023

(65) Prior Publication Data
US 2023/0300014 A1 Sep. 21, 2023

Related U.S. Application Data

(63) Continuation of application No. PCT/CN2021/141003, filed on Dec. 23, 2021.

(30) Foreign Application Priority Data

Dec. 31, 2020 (WO) .............. PCT/CN2020/141894
Jun. 29, 2021 (WO) .............. PCT/CN2021/102908

(51) Int. Cl.
*H04L 27/26* (2006.01)
*H04W 28/06* (2009.01)
*H04W 84/12* (2009.01)

(52) U.S. Cl.
CPC ....... *H04L 27/2615* (2013.01); *H04W 28/065* (2013.01); *H04W 84/12* (2013.01)

(58) Field of Classification Search
CPC ................ H04L 27/26; H04L 27/2615; H04L 27/2618; H04L 27/2621; H04L 27/262;
(Continued)

(56) References Cited

U.S. PATENT DOCUMENTS

| | | | |
|---|---|---|---|
| 10,880,066 | B2 | 12/2020 | Verma et al. |
| 2016/0165574 | A1 | 6/2016 | Chu et al. |
| 2020/0136884 | A1 | 4/2020 | Park et al. |
| 2020/0228380 | A1 | 7/2020 | Yang et al. |
| 2022/0150025 | A1* | 5/2022 | Tian ................ H04W 72/20 |

(Continued)

FOREIGN PATENT DOCUMENTS

| | | |
|---|---|---|
| CN | 106464709 A | 2/2017 |
| CN | 110417518 A | 11/2019 |

(Continued)

OTHER PUBLICATIONS

Shilo et al., "Reducing USIG PAPR via Disregard Bit Value," IEEE 802.11-21/0093r4, Total 78 pages, Institute of Electrical and Electronics Engineers, New York, New York (Apr. 29, 2021).

(Continued)

*Primary Examiner* — Khanh C Tran
(74) *Attorney, Agent, or Firm* — Leydig, Voit & Mayer, Ltd.

(57) ABSTRACT

This application relates to the field of communications technologies, in particular Wireless Local Area Network technologies, and provides a method and apparatus for reducing a peak to average power ratio (PAPR) for transmitting a physical layer protocol data unit (PPDU), in particular reducing the PAPR for the U-SIG field. Methods are disclosed for both an access point (AP) and stations (STA).

14 Claims, 13 Drawing Sheets

(58) Field of Classification Search
CPC ........... H04L 27/2623; H04L 27/2614; H04W 28/065; H04W 28/06
See application file for complete search history.

(56) References Cited

U.S. PATENT DOCUMENTS

| | | | | |
|---|---|---|---|---|
| 2023/0079928 A1* | 3/2023 | Tian | .................... | H04W 28/06 370/329 |
| 2023/0344694 A1* | 10/2023 | Shilo | .................... | H04L 5/0053 |
| 2024/0031828 A1* | 1/2024 | Yu | .................... | H04L 5/0005 |

FOREIGN PATENT DOCUMENTS

| | | |
|---|---|---|
| CN | 111786914 A | 10/2020 |
| CN | 112469088 A | 3/2021 |
| WO | 2020050528 A1 | 3/2020 |
| WO | 2020159163 A1 | 8/2020 |
| WO | 2021033929 A1 | 2/2021 |

OTHER PUBLICATIONS

IEEE P802.11ax/D8.0, Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, Total 820 pages, Institute of Electrical and Electronics Engineers, New York, New York (Oct. 2020).

Seytnazarov et al., Parallel PPDU Transmission Mechanism for Wideband Wireless LANs, IEEE Access, Total 16 pages, Institute of Electrical and Electronics Engineers, New York, New York (Received Sep. 21, 2020, accepted Oct. 25, 2020, date of publication Oct. 29, 2020, date of current version Nov. 12, 2020).

Vermani et al., "PDT PHY Update to Preamble U-SIG," Qualcomm, IEEE Draft, vol. 802, No. 2, pp. 1-15, Institute of Electrical and Electronics Engineers, New York, New York (Nov. 20, 2020).

Deng et al., "IEEE 802.11be—Wi-Fi 7: New Challenges and Opportunities," IEEE Communications Surveys and Tutorials, Total 30 pages, Institute of Electrical Electronics Engineers, New York, New York (Jul. 29, 2020).

Caballe et al., "An Alternative to IEEE 802.11ba: Wake-Up Radio With Legacy IEEE 802.11 Transmitters," IEEE Access, Total 19 pages, Institute of Electrical Electronics Engineers, New York, New York (Apr. 9, 2019).

Charter Communications, "On Channel Access extensions for NR-U," 3GPP TSG-RAN Meeting #83, Shenzhen, China, RP-190199, Total 3 pages, 3rd Generation Partnership Project, Valbonne, France (Mar. 18-21, 2019).

* cited by examiner

| Bits in the Special User Info field | Action to receiving STA |
|---|---|
| B25–B30 | Copy to B20–B25 of the U-SIG-1 field (Disregard subfield) |
| B31 | Copy to B2 of the U-SIG-2 field (Validate subfield) |
| B32–B36 | Copy to B11–B15 of the U-SIG-2 field (Disregard subfield) |

FIG. 11

METHOD AND APPARATUS FOR REDUCING A PEAK TO AVERAGE POWER RATIO IN THE TRANSMISSION OF PHYSICAL LAYER PROTOCOL DATA UNITS

CROSS-REFERENCE TO RELATED APPLICATIONS

This application is a continuation of International Application No. PCT/CN2021/141003, filed on Dec. 23, 2021, which claims priority to International Patent Application No. PCT/CN2021/102908, filed on Jun. 29, 2021 and International Patent Application No. PCT/CN2020/141894, filed on Dec. 31, 2020. All of the aforementioned patent applications are hereby incorporated by reference in their entireties.

TECHNICAL FIELD

The present disclosure relates to wireless communication systems and, more specifically, but not exclusively, to a system and method for reducing a peak to average power ratio (PAPR) in a universal signal (U-SIG) field of a physical layer protocol data unit (PPDU).

BACKGROUND

A U-SIG field is used in the IEEE standard 802.11be (Standard for Information technology—Telecommunications and information exchange between systems Local and metropolitan area network of May 2021) to convey information to all receivers about various important parameters such as a standard version (802.11be or later version), a bandwidth, a number of extremely high throughput, EHT, signal (EHT-SIG) symbols, etc. The receivers include both access points (AP) and/or stations (STAs). The U-SIG is composed of 2 Orthogonal Frequency Division Multiplexing (OFDM) symbols, and each OFDM symbol contains 26 information bits.

Since the standard 802.11be is divided into two releases—Release 1 and Release 2, and Release 2 is in the progress of study, some bits within the U-SIG field are reserved.

There is an agreement to divide these reserved bits into two types:
  Validate bits—used by the receiver to determine whether to continue receiving the packet or end the reception. For example, a Release 1 receiver may understand that the packet is intended for a Release 2 receiver so it can end the reception.
  Sequence of disregard bits—bits that are defined as "don't care" and are typically ignored by receivers.

Both validate and sequence of disregard bits may be used for other purposes within Release 2.

In a trigger-based (TB) PPDU, the sequence of disregard bits is copied from a trigger frame. Said trigger frame is transmitted by APs, and indicates to STAs that they can start transmitting, as well as relevant information for those transmissions (e.g. where to transmit, what modulation to use, etc.).

The sequence of disregard bits may cause problems of performance for TB PPDUs. For example, if all disregard bits are set to 1, it will yield an un-necessarily high PAPR of the entire U-SIG field, which may require the transmitting STAs to increase the power amplifier backoff, which reduces the transmit power. If the STAs do not increase the backoff, the high PAPR may cause distortions to the transmitted signal (due to, for example, clipping of the time-domain signal).

SUMMARY

It is an objective of the present disclosure to provide a method and apparatus for reducing a PAPR for transmitting TB PPDUs, in particular the PAPR of the U-SIG field, thereby improving the transmitting performance of the PPDU.

The foregoing and other objectives are achieved by the features of the independent claims. Further embodiments are apparent from the dependent claims, the description and the figures.

According to a first aspect of the present disclosure, a communication device for transmitting a physical layer protocol data unit, PPDU, to one or more receiving devices is disclosed. The communication device comprises a processor configured to receive a trigger frame in a first PPDU, and to obtain a sequence of disregard bits of a universal signal, U-SIG, field in the first PPDU. The sequence of disregard bits comprises at least one bit set to 0, and is copied into the U-SIG field of a second PPDU. The communication device further comprises a transmitter configured to transmit the second PPDU, wherein the second PPDU comprises the sequence of disregard bits. The use of a sequence of disregard bits comprising at least one bit set to 0 allows achieving a reduced Peak to Average Power Ratio (PAPR), thereby allowing the STA to refrain from increasing the power amplifier backoff and transmitting with higher efficiency. Alternatively, it reduces the probability that the STA's transmission, in particular that of the U-SIG field, suffers from distortions caused by the high PAPR (due to, for example, clipping).

In a further embodiment of the first aspect, the U-SIG field comprises at least a first U-SIG symbol and a second U-SIG symbol.

In a further embodiment of the first aspect, the processor is configured to obtain the sequence of disregard bits by obtaining one of the sequences in the set {11111111110, 11111011110, 01111111110}. The use of any of the sequences in this set as the sequence of disregard bits allows achieving an even more reduced Peak to Average Power Ratio (PAPR), thereby allowing the STA to refrain from increasing the power amplifier backoff and transmitting with higher efficiency. Alternatively, it reduces the probability that the STA's transmission, in particular that of the U-SIG field, suffers from distortions caused by the high PAPR (due to, for example, clipping).

According to a second aspect of the present disclosure, an access point for transmitting a physical layer protocol data unit, PPDU, to one or more communication devices is disclosed. The access point comprises a processor configured to set a field of a trigger frame to a sequence comprising at least one 0. The access point further comprises a transmitter configured to transmit the PPDU to the one or more communication devices, wherein the PPDU comprises the field of the trigger frame, wherein the field of the trigger frame is configured to be copied by the one or more communication devices into disregard bits of a universal signal, U-SIG, sequence.

In a further embodiment of the second aspect, the field of the trigger frame may be, for example, a special user info field.

In a further embodiment of the second aspect, the processor of the access point is configured to set the field of the trigger frame by setting the field to one of the sequences in the set {11111111110, 11111011110, 01111111110}.}. The use of any of the sequences in this set as the sequence of disregard bits allows achieving an even more reduced Peak to Average Power Ratio (PAPR), thereby allowing the STA to refrain from increasing the power amplifier backoff and transmitting with higher efficiency. Alternatively, it reduces the probability that the STA's transmission, in particular that of the U-SIG field, suffers from distortions caused by the high PAPR (due to, for example, clipping).

According to a third aspect of the present disclosure, a method for transmitting a physical layer protocol data unit, PPDU, in a communication device is disclosed. The method comprises receiving a trigger frame in a first PPDU, and obtaining a sequence of disregard bits of the universal signal U-SIG field in said first PPDU, wherein the sequence of disregard bits comprises at least one bit set to 0. Further, the method comprises copying the sequence of disregard bits into the U-SIG field of a second PPDU, and transmitting the second PPDU, which comprises the sequence of disregard bits. The use of a sequence of disregard bits comprising at least one bit set to 0 allows achieving a reduced Peak to Average Power Ratio (PAPR), thereby allowing the STA to refrain from increasing the power amplifier backoff and transmitting with higher efficiency. Alternatively, it reduces the probability that the STA's transmission, in particular that of the U-SIG field, suffers from distortions caused by the high PAPR (due to, for example, clipping).

In a further embodiment of the third aspect, the U-SIG field comprises at least a first U-SIG symbol and a second U-SIG symbol.

In a further embodiment of the third aspect, obtaining the sequence of disregard bits comprises obtaining one of the sequences in the set {1111111110, 11111011110, 01111111110}. The use of any of the sequences in this set as the sequence of disregard bits allows achieving an even more reduced Peak to Average Power Ratio (PAPR), thereby allowing the STA to refrain from increasing the power amplifier backoff and transmitting with higher efficiency. Alternatively, it reduces the probability that the STA's transmission, in particular that of the U-SIG field, suffers from distortions caused by the high PAPR (due to, for example, clipping).

According to a fourth aspect of the present disclosure, a method for transmitting a physical layer protocol data unit, PPDU, in an access point is disclosed. The method comprises setting a field of a trigger frame to a sequence comprising at least one 0, and transmitting the PPDU to one or more communication devices, wherein the PPDU comprises the field of the trigger frame, wherein the field of the trigger frame is configured to be copied by the one or more communication devices into disregard bits of a universal signal, U-SIG, sequence. The use of a sequence of disregard bits comprising at least one bit set to 0 allows achieving a reduced Peak to Average Power Ratio (PAPR), thereby allowing the STA to refrain from increasing the power amplifier backoff and transmitting with higher efficiency. Alternatively, it reduces the probability that the STA's transmission, in particular that of the U-SIG field, suffers from distortions caused by the high PAPR (due to, for example, clipping).

In a further embodiment of the fourth aspect, obtaining the sequence of disregard bits comprises obtaining one of the sequences in the set {11111111110, 11111011110, 01111111110}. The use of any of the sequences in this set as the sequence of disregard bits allows achieving an even more reduced Peak to Average Power Ratio (PAPR), thereby allowing the STA to refrain from increasing the power amplifier backoff and to transmit with higher efficiency. Alternatively, it reduces the probability that the STA's transmission, in particular that of the U-SIG field, suffers from distortions caused by the high PAPR (due to, for example, clipping).

According to a fifth aspect of the present disclosure, a machine-readable storage medium having stored thereon processor-executable instructions is disclosed. When executed by a processor of a device, said instructions cause the device to implement a method according to any of the methods disclosed.

According to a sixth aspect of the present disclosure, a computer program product comprising a computer-readable storage medium having computer-readable instructions stored thereon is disclosed, the computer-readable instructions being executable by a device comprising processing hardware to execute any of the methods disclosed.

According to a seventh aspect of the present disclosure, a computer storage medium, or computer program product of any one of the methods of reducing PAPR is disclosed.

Other apparatus, methods, features, and advantages of the present disclosure will be or become apparent to one with skill in the art upon examination of the following drawings and detailed description. It is intended that all such additional apparatus, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

FIG. 11 shows the 'U-SIG Disregard and Validate' field used in the context of the present disclosure to communicate the disregard bits sequence;

DETAILED DESCRIPTION

Figure 1:
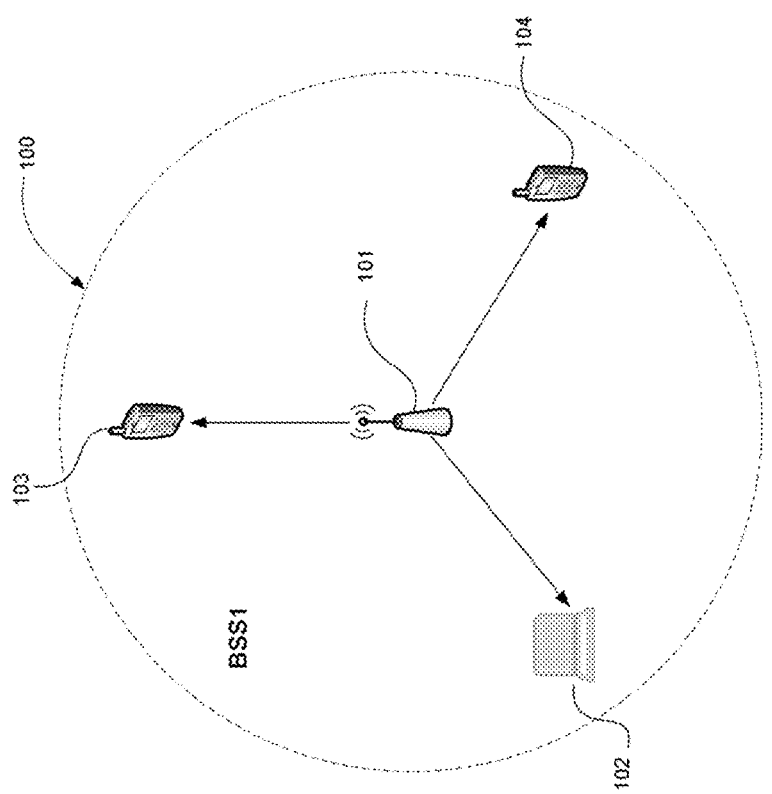
FIG. 1 shows a system for reducing PAPR in a field of PPDUs according to some embodiments of the present disclosure.

Before explaining at least one embodiment in detail, it is to be understood that embodiments are not necessarily limited in their application to the details of construction and the arrangement of the components and/or methods set forth in the following description and/or illustrated in the drawings and/or the Examples. Implementations described herein are capable of other embodiments or of being practiced or carried out in various ways.

FIG. 1 shows a system for reducing the PAPR in a field of PPDUs according to some embodiments of the present disclosure. System 100 includes an access point (AP) 101 and one or more stations (STAs), for example STA 102, STA 103, and STA 104 shown in FIG. 1. The system 100 is also called basic service set (BSS) in the present disclosure. In system 100, the AP and the STAs communicate in both downlink and uplink. The arrows between AP and STAs shown in FIG. 1 only show downlink, but it should not be understood as a limitation of transmission.

Although the system 100 shows only one AP in the system, the system may include more than one AP in the system and the APs in the system may perform coordinated transmission.

The system 100 in the present disclosure includes but is not limited to: a wireless fidelity (WIFI) communication system, a narrowband internet of things (NB-IoT) system, a long term evolution (LTE) system, a $5^{th}$ generation mobile communications system (5G) or beyond, a machine to machine (M2M) communications system, or the like. The LTE system and 5G or beyond may integrate a WIFI system.

In the present disclosure, a communication device may be AP 101 or STAs, and a STA may be, for example, a mobile phone, an intelligent terminal, a tablet computer (tablet), a notebook computer (laptop), a video game console, a multimedia player, vehicle which supports WIFI, device to device (D2D) equipment, or any smart devices. The AP and/or STA may be stationary or mobile devices.

The WIFI system may support all the Institute of Electrical and Electronic Engineers (IEEE) 802.11 serials including but not limited to: 802.11a/b/g, 802.11n, 802.11ac, 802.11ax, 802.11be or beyond.

Figure 2:
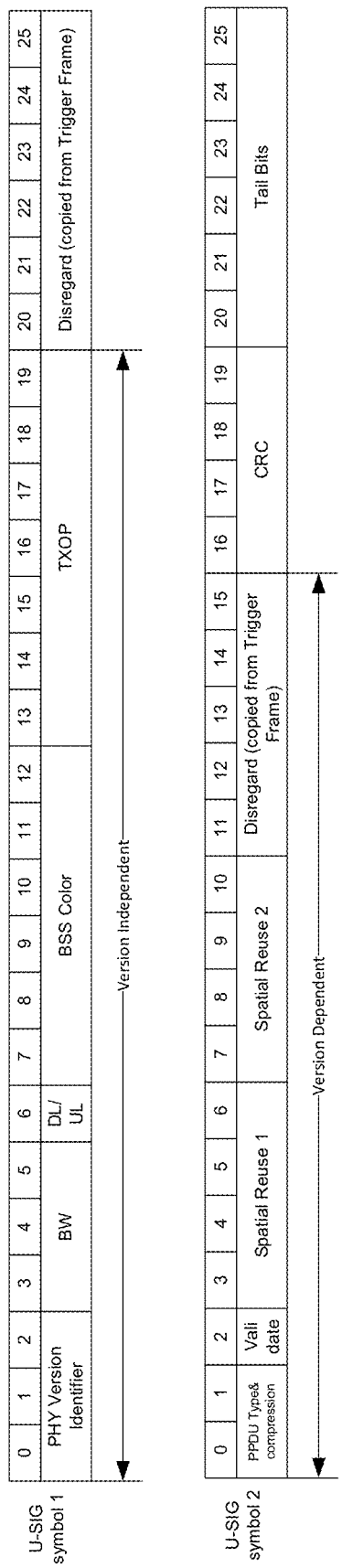
FIG. 2 shows a U-SIG design for a TB PPDU in 802.11be Release 1.

FIG. 2 shows a U-SIG design for a TB PPDU in 802.11be Release 1. The bits contained in the U-SIG's first symbol of TB PPDU convey information about the PHY version (e.g. 802.11be or a later version of the standard), the BW (e.g. 20 MHz, 40 MHz etc.), whether it is a DL or UL transmission, the BSS Color which differentiates between possibly different neighboring BSS values, TXOP which may include duration of the TXOP and/or how long the transmitter is taking advantage of the channel resources. The bits contained in the U-SIG's second symbol, for a TB PPDU, convey information about a PPDU type (e.g. MU, TB), spatial reuse (e.g. spatial reuse 1 and spatial reuse 2) which allows multiple transmitters to transmit simultaneously on the same resources a CRC and 6 zero tail bits used for the convolutional code.

As shown in both FIG. 2, the sequence of disregard bits is located in the first and second U-SIG symbols; however, the CRC is computed as a function of all preceding bits which include both first U-SIG symbol and second U-SIG symbol, so the value of the CRC bits (located in the second U-SIG symbol) is also a function of the sequence of disregard bits located in the first U-SIG symbol.

In 802.11ax, a trigger frame contains 9 reserved bits and all 9 bits are set to '1'. The 9 reserved bits are copied to the second symbol of the HE-SIG-A field of a TB PPDU. In the current stage of 802.11be development, respective to a TB PPDU, there are 6 sequences of disregard bits in the first U-SIG symbol and 5 sequences of disregard bits in the second U-SIG symbol. All sequence of disregard bits are currently defined (in current stage of 802.11be development) as copied from the trigger frame (similar to 802.11ax operation). Maintaining the same design in 11 be as it is in 11 ax, the sequence of disregard bits copied from the trigger frame may be set to one.

Although a structure of the trigger frame is not presented in the present disclosure, the sequence of disregard bits in the trigger frame, and TB PPDU comprises contiguous binary bits '1' which can lead to high PAPR, and the performance of the U-SIG field for a TB PPDU will be impacted in consequence (e.g. with lower PAPR, the power amplifier backoff can be reduced, thereby increasing efficiency).

Figure 3:
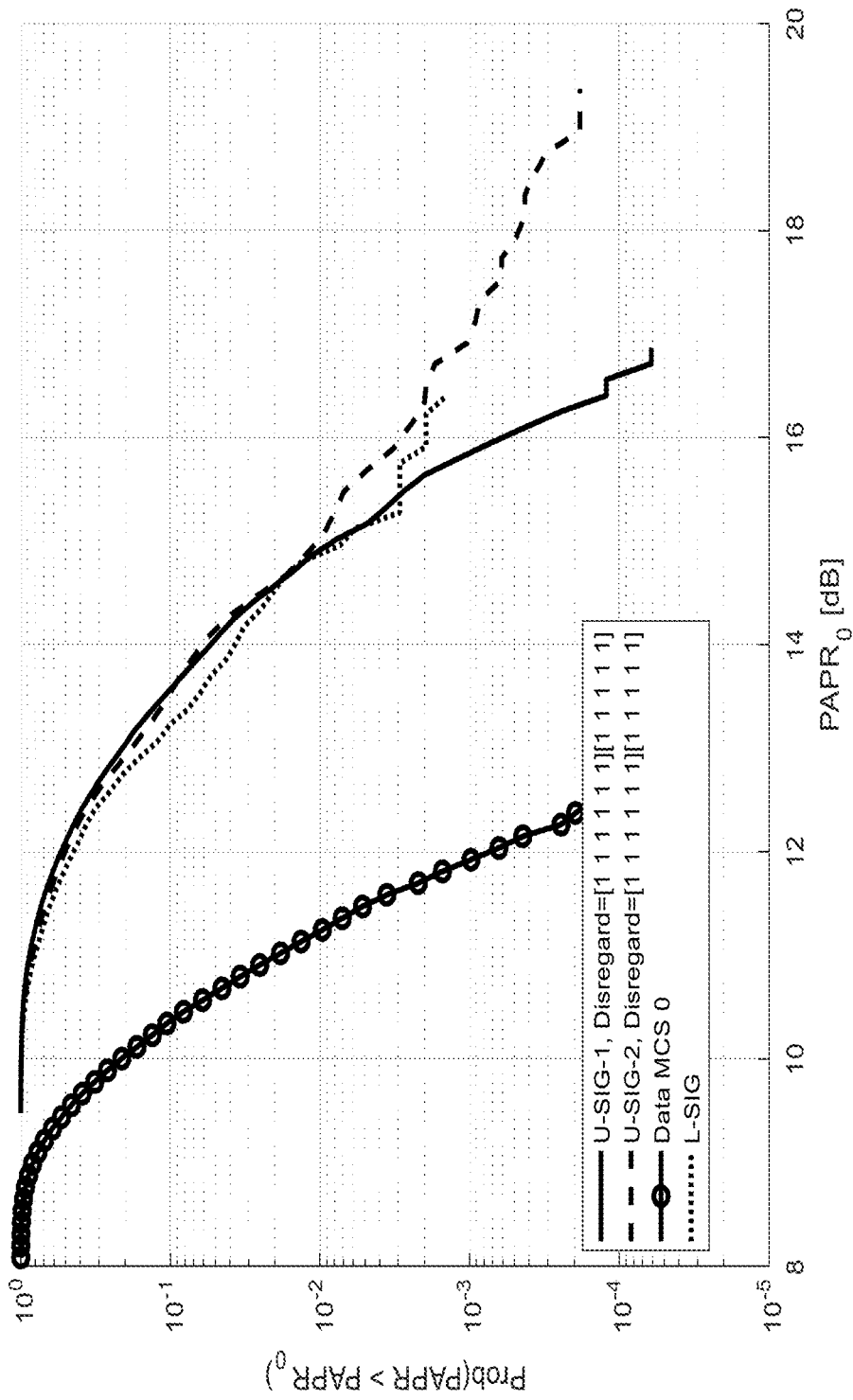
FIG. 3 shows the Complementary Cumulative Density Function (CCDF) of the PAPR of the U-SIG-1 and U-SIG-2 symbols with a BW of 320 MHz.

FIG. 3 shows a Complementary Cumulative Density Function (CCDF) of the PAPR of both U-SIG symbols for 320 MHz BW (U-SIG-1 means in FIG. 3 means the first symbol of the U-SIG field, and U-SIG-2 means the second symbol of the U-SIG field). The sequence of disregard bits in the U-SIG symbols is assumed to be all ones. FIG. 3 shows the Complementary Cumulative Density Function (CCDF) of the PAPR of both U-SIG symbols, and compared with that of the data portion (assuming MCS 0=BPSK rate 1/2) and with that of the Legacy SIG (L-SIG) field. As shown, the U-SIG PAPR is higher than that of the data by a large margin. It is also larger than that of the L-SIG field, especially the PAPR of the U-SIG-2 symbol.

Figure 4:
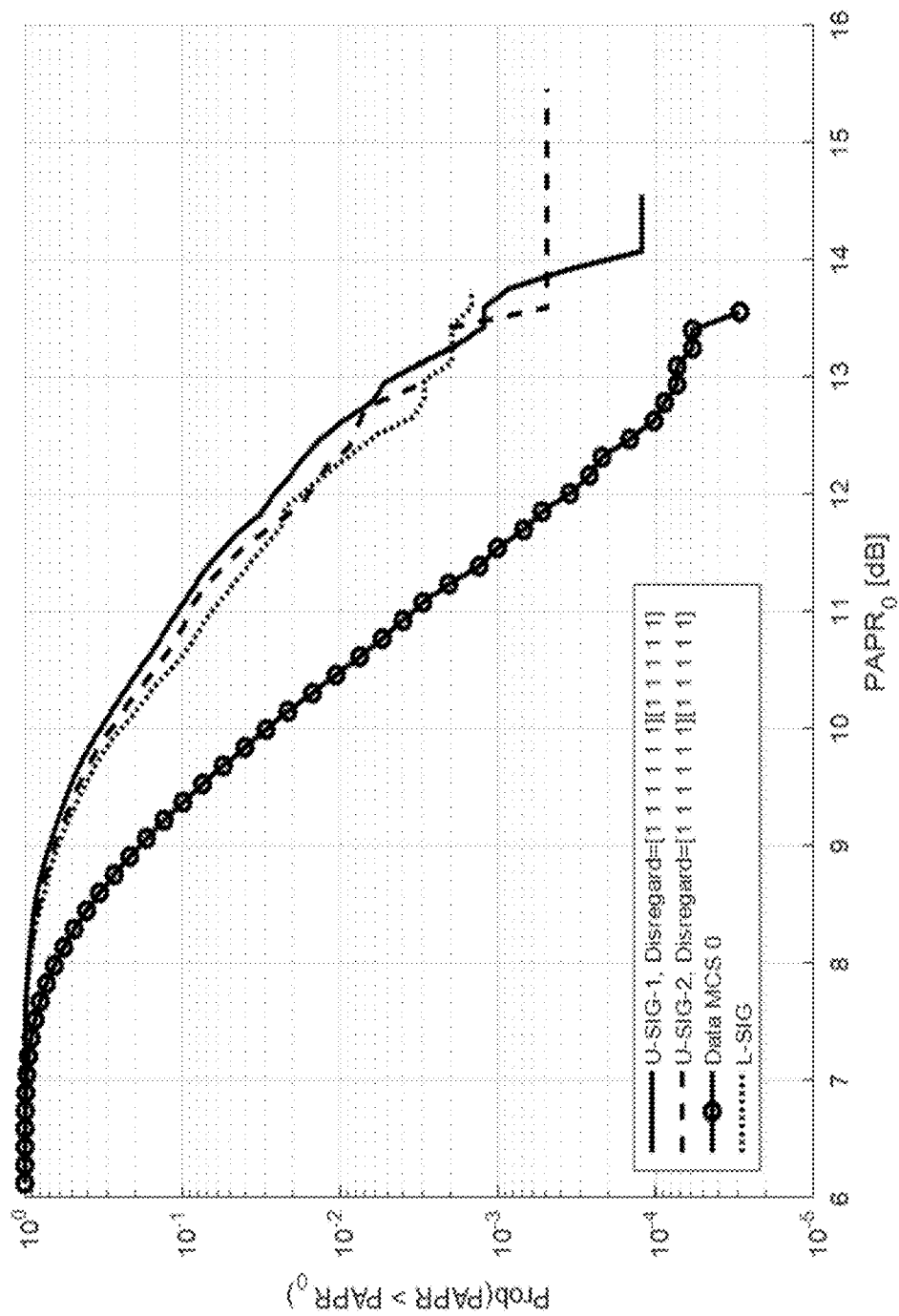
FIG. 4 shows the Complimentary Cumulative Density Function (CCDF) of the PAPR of the U-SIG-1 and U-SIG-2 symbols with a BW of 40 MHz.
Figure 5:
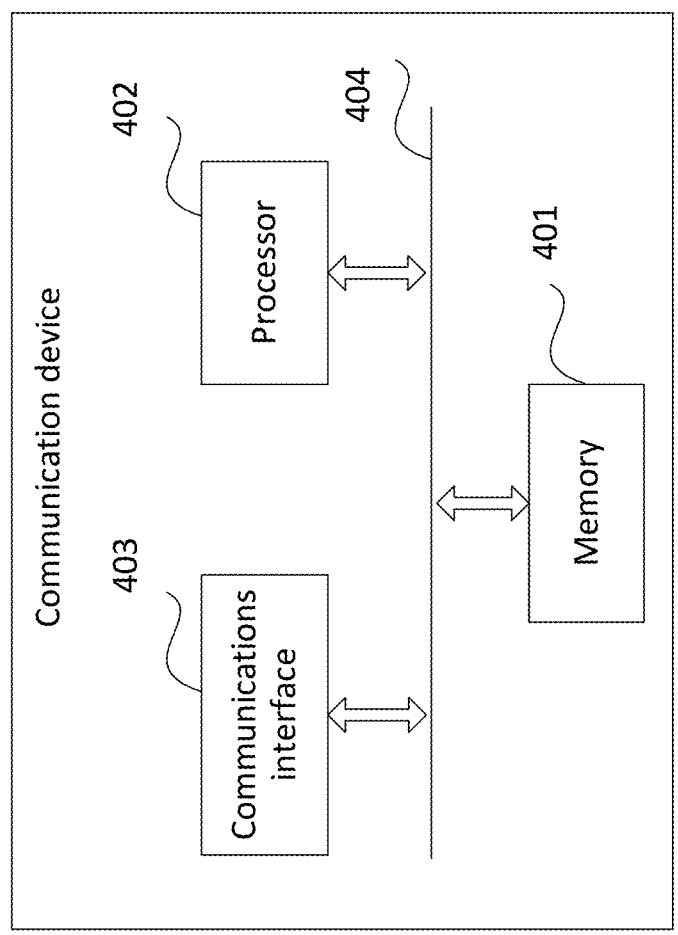
FIG. 5 is a schematic diagram of a possible logical structure of a communication device according to some embodiments of the present disclosure.

FIG. 4 shows a CCDF of the PAPR of both U-SIG symbols for 40 MHz BW. It is shown that the effect shown in relation to FIG. 5 is consistent for other BW values and puncturing patterns. FIG. 4 shows a similar comparison with 40 MHz BW. As shown therein, the PAPR of both U-SIG symbols also exceeds that of the L-SIG field and the data payload.

The current standard defines that pre-EHT fields that are duplicated on every 20 MHz portion (e.g. L-SIG, U-SIG etc.) undergo per-20 MHz phase rotation in order to reduce the PAPR. However, as shown in FIG. 3 and FIG. 4, the U-SIG PAPR is higher than both data and L-SIG, which means it is the limiting factor in terms of performance (it may define the power amplifier backoff).

It can be seen based on the simulation results from FIG. 3 and FIG. 4 that it is therefore of importance to reduce the PAPR of the U-SIG field.

In order to solve the problem above, the present disclosure provides a method and/or apparatus to reduce the PAPR of the TB PPDU, and in particular the PAPR of the U-SIG field.

Embodiments present in the present disclosure may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to: an electronic storage device, a magnetic storage device, an optical storage device, an electromagnetic storage device, a semiconductor storage device, or any suitable combination of the foregoing.

A non-exhaustive list of more specific examples of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. A network adapter card or network interface in each computing/processing device may receive computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

FIG. 5 is a schematic diagram of a possible logical structure of a communication device in the present disclosure according to some embodiments. The communication device includes a processor 402. In some embodiments of the present disclosure, the processor 402 may be configured to control and manage one or more actions of the communication device, e.g. configured to execute a code for operating on a sequence of disregard bits to reduce the PAPR and/or to process the data transmitted and/or received in the AP. Optionally, the communication device may further include a memory 401 and a communications interface 403. The processor 402, the communications interface 403, and the memory 401 may be connected to each other or may be connected to each other by using a bus 404. The communications interface 403 is configured to support the communication device in performing communication, and the memory 401 is configured to store program code and data of the communication device. The processor 402 calls the code stored in the memory 401 to perform control and management. The memory 401 may or may not be coupled to the processor 402.

The processor 402 may be a central processing unit, a general-purpose processor, a digital signal processor, an application-specific integrated circuit, a field programmable gate array or another programmable logical device, a transistor logical device, a hardware component, or any combination thereof. The processor 402 may implement or execute various example logical blocks, modules, and circuits described with reference to content disclosed in the present disclosure. Alternatively, the processor 402 may be a combination of processors implementing a computing function, for example, a combination of one or more microprocessors, or a combination of the digital signal processor and a microprocessor. The bus 404 may be a peripheral component interconnect (, PCI) bus, an extended industry standard architecture 0 bus, or the like. The bus may be classified into an address bus, a data bus, a control bus, and the like.

According to the communication device provided above, in some embodiments, the U-SIG may comprise at least a first U-SIG symbol and a second U-SIG symbol.

The sequence of disregard bits in the present disclosure may be the predefined bits sequence in the prior art, e.g. present IEEE protocol. The sequence of disregard bits in some embodiments may be 5 or 6 bits and all bits are set as binary '1' in a TB PPDU. The sequence of disregard bits may refer to the 6-bit sequence of disregard bits of the first U-SIG symbol in the TB PPDU, and/or to the 5-bit sequence of disregard bits of the second U-SIG symbol in the TB PPDU. It should be noted that the sequence of disregard bits may include other number of binary bits and 5-bit or 6-bit is not a limitation in the present disclosure.

Figure 6:
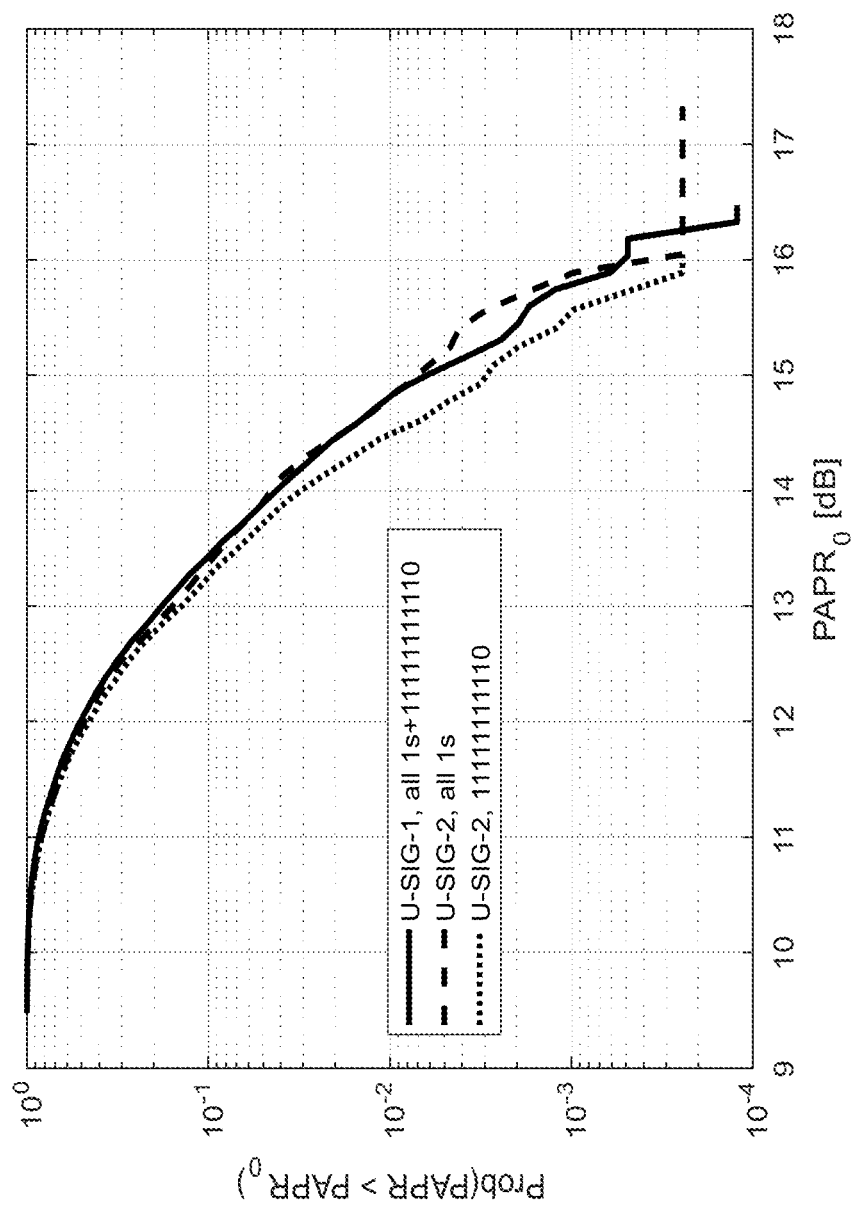
FIG. 6 shows a comparison of the CCDF of the PAPR using the disregards bits sequence '11111111110' with the use of the disregard bits sequence '11111111111' assuming a BW of 320 MHz without puncturing.
Figure 7:
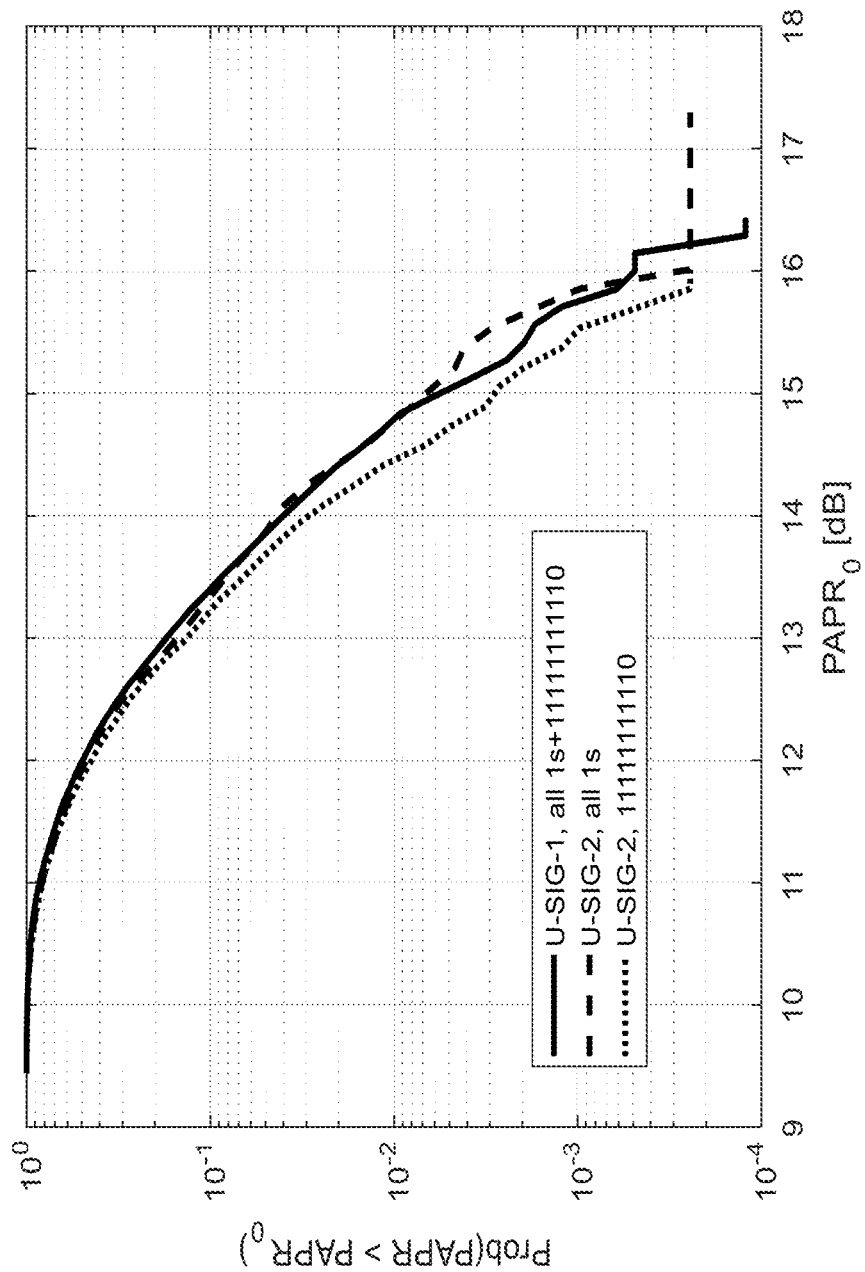
FIG. 7 shows a comparison of the CCDF of the PAPR using the disregards bits sequence '11111111110' with the use of the disregard bits sequence '11111111111' assuming a BW of 320 MHz with puncturing pattern 1111111100001111.

FIG. 6 shows a CCDF of the PAPR assuming a disregard bits sequence in which all bits are set to '1' except a single '0' in the edge of either U-SIG-1 or U-SIG-2, assuming 320 MHz without puncturing. In particular, the sequence '111111' in U-SIG-1 and '11110' in U-SIG-2 (so in total '11111111110') is shown, which yields the lowest PAPR. FIG. 7 compares the CCDF of the PAPR of the all 1s case with that of the '11111111110' sequence, with a single '0' in the end of the sequence, assuming 320 MHz without puncturing. Since the first six values are identical in both sequences, the CCDF curves for U-SIG-1 for both '11111111111' and '11111111110' is identical. For U-SIG-2, an improvement with the single '0' can be observed.

FIG. 7 shows a comparison between the CCDF of the PAPR of the all 1s case with that of the sequence of disregard bits with a single '0' at the end of the sequence, assuming 320 MHz with puncturing pattern 1111111100001111. Again, since the first six values are identical in both sequences, the CCDF curve for U-SIG-1 is identical. For U-SIG-2, an improvement with the single '0' can be observed.

Figure 8:
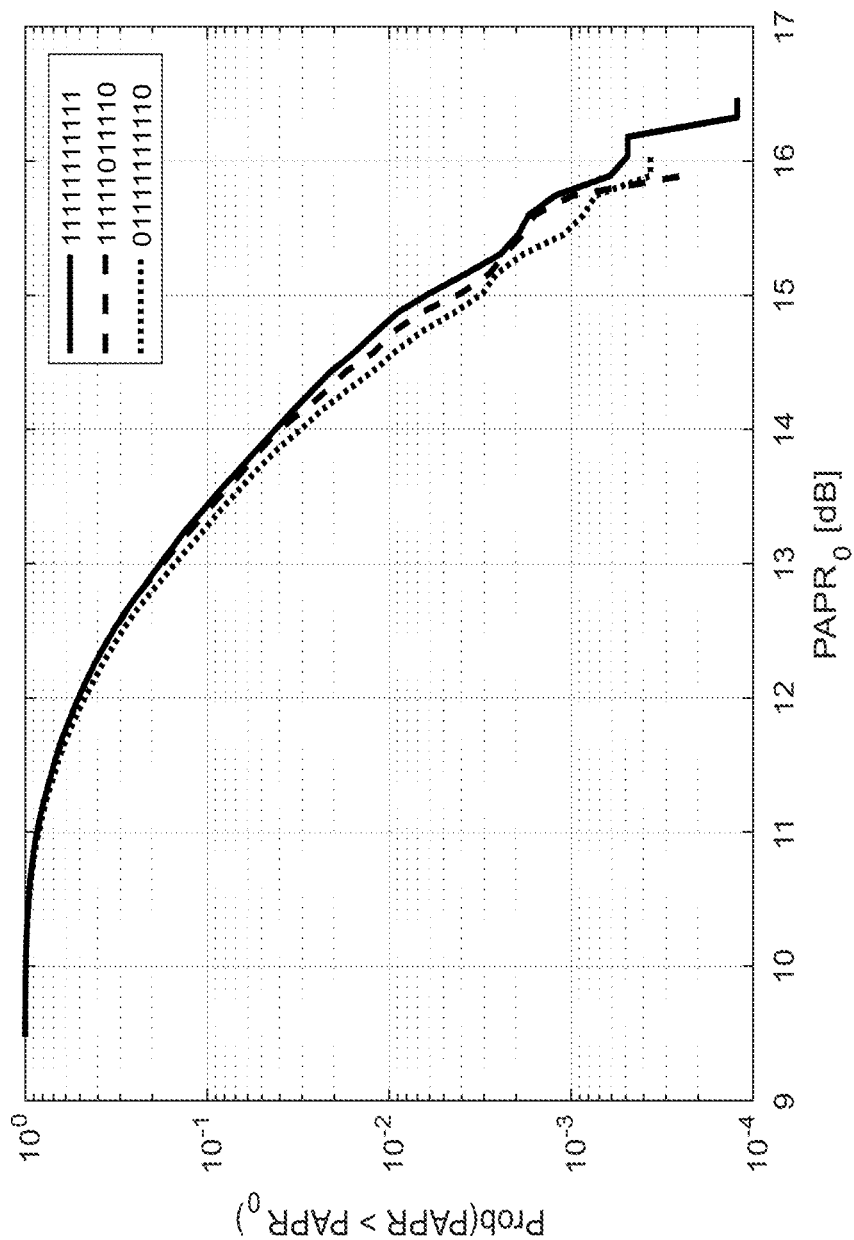
FIG. 8 shows a comparison of the CCDF of the PAPR using the disregards bits sequence '11111011110' and '01111011110' with the use of the disregard bits sequence '11111111111', assuming 320 MHz without puncturing, for U-SIG-1.

FIG. 8 shows an example in which all bits are set to '1' except a single '0' in the edge of both U-SIG-1 and U-SIG-2. In other words, using two values of '0' in the entire sequence, one '0' in U-SIG-1 and one '0' in U-SIG-2.

In particular, the following sequences are shown in FIG. 8:

'111110' in U-SIG-1 and '11110' in U-SIG-2 (so in total '11111011110')

'011111' in U-SIG-1 and '11110' in U-SIG-2 (so in total '01111111110')

FIG. 8 shows a comparison between the CCDF of the PAPR of the all 1s case with that of the sequences suggested above, assuming 320 MHz without puncturing, for U-SIG-1. As shown in FIG. 8, there is an improvement in the PAPR.

Figure 9:
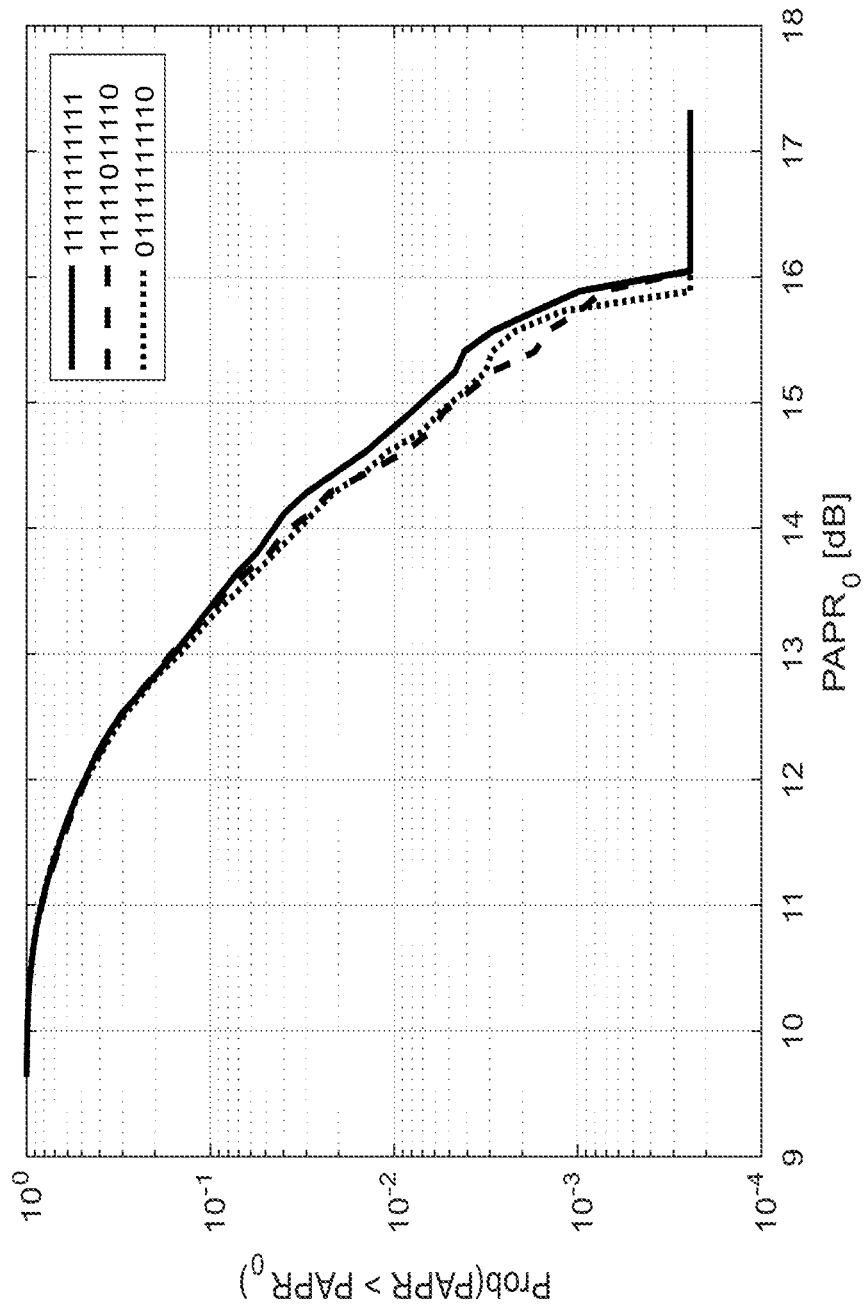
FIG. 9 shows a comparison of the CCDF of the PAPR using the disregard bits sequence '11111011110' and '01111011110' with the use of the disregard bits sequence '11111111111', assuming 320 MHz without puncturing, for U-SIG-2.

FIG. 9 shows a comparison between the CCDF of the PAPR of the all 1s case with that of the same sequences as in FIG. 8, assuming 320 MHz without puncturing, for U-SIG-2. As shown in FIG. 9, there is an improvement in the PAPR.

Figure 10:
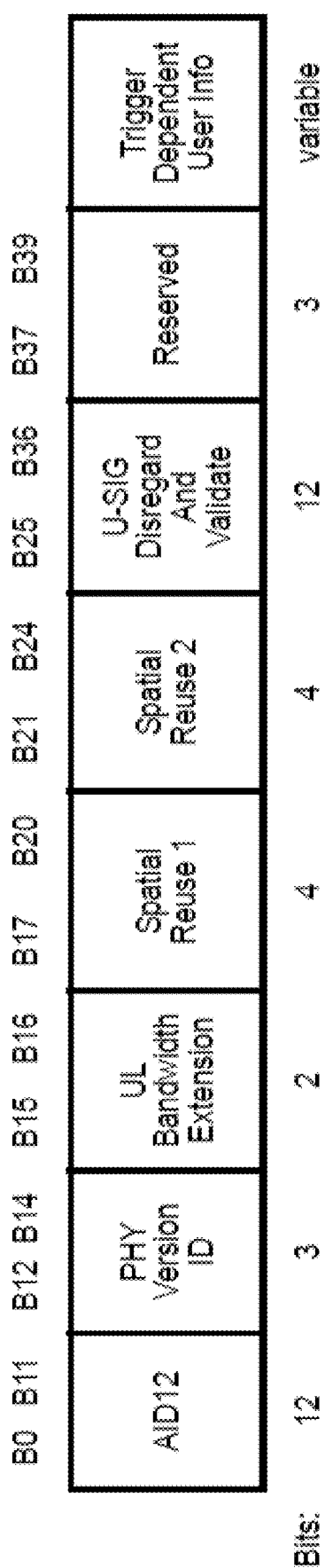
FIG. 10 shows the structure of the special user info field within a trigger frame as in the context of the present disclosure.

FIG. 10 shows the special user info field from an exemplary trigger frame of the present disclosure. In an example of the present disclosure, the field between B25 and B36 can be used as the field in which a disregard bits sequence is transmitted from an access point, which is received by communication devices and used as disregard bits sequence, such that a reduced PAPR is achieved.

FIG. 11 shows a definition of the 'U-SIG Disregard and Validate' subfield, and the copying of the disregard bits sequence into the U-SIG field.

Figure 12:
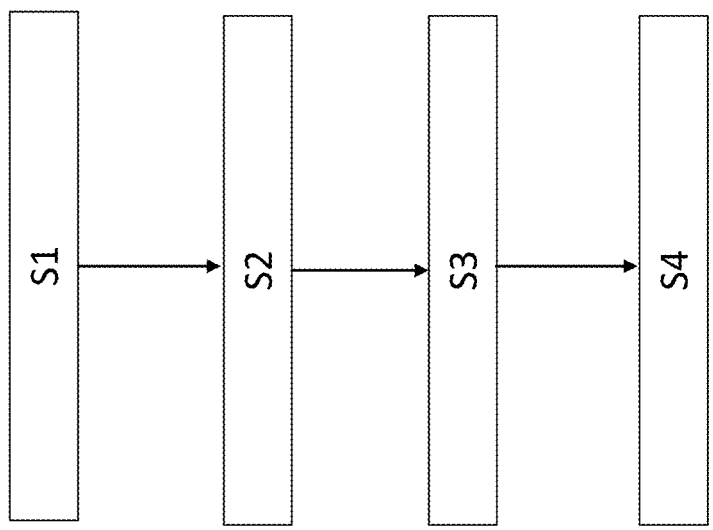
FIG. 12 is a workflow of a method for transmitting a physical layer protocol data unit, PPDU, in a communication device.

FIG. 12 shows a workflow of a method for transmitting a physical layer protocol data unit, PPDU, in a communication device. The method comprises a step S1 of receiving a trigger frame in a first PPDU. Further, the method comprises a step S2 of obtaining a sequence of disregard bits of a universal signal, U-SIG, field in the first PPDU, wherein the sequence of disregard bits comprises at least one bit set to 0. Also, the method further comprises a step S3 of copying the sequence of disregard bits into the U-SIG field of a second PPDU, and a step S4 of transmitting the second PPDU, wherein the second PPDU comprises the sequence of disregard bits.

Figure 13:
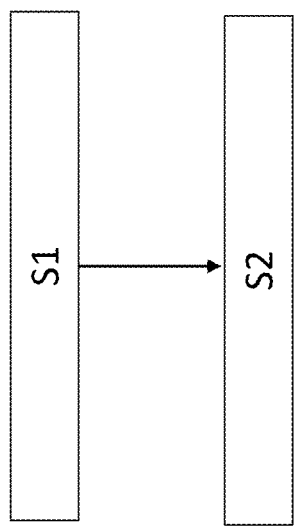
FIG. 13 is a workflow of a method for transmitting a physical layer protocol data unit, PPDU, in an access point.

FIG. 13 shows a workflow of a method for transmitting a physical layer protocol data unit, PPDU, in an access point. The method comprises a step S1 of setting a field of a trigger frame to a sequence comprising at least one 0. The method further comprises a step S2 of transmitting the PPDU to one or more communication devices, wherein the PPDU comprises the field of the trigger frame, wherein the field of the trigger frame is configured to be copied by the one or more communication devices into disregard bits of a universal signal, U-SIG, sequence.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terms "comprises", "comprising", "includes", "including", "having" and their conjugates mean "including but not limited to".

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable sub-combination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Although the present disclosure describes the solution for reducing the PAPR from apparatus point of view, it is obvious for a skilled person to understand that the problems to be addressed in the present disclosure can also be implemented by a method and/or system. The method for reducing PAPR will not be elaborated in order to avoid redundancy.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to embodiments. To the extent that section headings are used, they should not be construed as necessarily limiting.

What is claimed is:

1. A communication device for transmitting a physical layer protocol data unit, PPDU, to one or more receiving devices, wherein the communication device comprises:
a processor configured to:
receive a trigger frame in a first PPDU;
obtain a sequence of disregard bits of a universal signal, U-SIG, field in the first PPDU, wherein the sequence of disregard bits comprises at least one bit set to 0; and
copy the sequence of disregard bits into the U-SIG field of a second PPDU; and
a transmitter configured to transmit the second PPDU, wherein the second PPDU comprises the sequence of disregard bits.

2. The communication device according to claim 1, wherein the U-SIG field comprises at least a first U-SIG symbol and a second U-SIG symbol.

3. The communication device according to claim 1, wherein the processor is configured to obtain the sequence of disregard bits by obtaining one of the sequences in the set {11111111110, 11111011110, 01111111110}.

4. An access point for transmitting a physical layer protocol data unit, PPDU, to one or more communication devices, wherein the access point comprises:
a processor configured to set a field of a trigger frame to a sequence comprising at least one 0; and
a transmitter configured to transmit the PPDU to the one or more communication devices, wherein the PPDU comprises the field of the trigger frame, wherein the field of the trigger frame is configured to be copied by the one or more communication devices into disregard bits of a universal signal, U-SIG, sequence.

5. The access point according to claim 4, wherein the processor is configured to set the field of the trigger frame by setting the field to one of the sequences in the set {11111111110, 11111011110, 01111111110}.

6. A method for transmitting a physical layer protocol data unit, PPDU, in a communication device, the method comprising:
receiving a trigger frame in a first PPDU;
obtaining a sequence of disregard bits of a universal signal, U-SIG, field in the first PPDU, wherein the sequence of disregard bits comprises at least one bit set to 0;
copying the sequence of disregard bits into the U-SIG field of a second PPDU; and
transmitting the second PPDU, wherein the second PPDU comprises the sequence of disregard bits.

7. The method according to claim 6, wherein the U-SIG field comprises at least a first U-SIG symbol and a second U-SIG symbol.

8. The method according to claim 6, wherein obtaining the sequence of disregard bits comprises obtaining one of the sequences in the set {11111111110, 11111011110, 01111111110}.

9. A non-transitory machine-readable storage medium having stored thereon processor-executable instructions, which when executed by a processor of a device, cause the device to implement a method according to claim 6.

10. A non-transitory computer program product comprising a computer-readable storage medium having computer-readable instructions stored thereon, the computer-readable instructions being executable by a device comprising processing hardware to execute a method according to claim 6.

11. A method for transmitting a physical layer protocol data unit, PPDU, in an access point, wherein the method comprises:
setting a field of a trigger frame to a sequence comprising at least one 0; and
transmitting the PPDU to one or more communication devices, wherein the PPDU comprises the field of the trigger frame, wherein the field of the trigger frame is configured to be copied by the one or more communication devices into disregard bits of a universal signal, U-SIG, sequence.

12. The method according to claim 11, wherein setting the field of the trigger frame to the sequence of disregard bits comprises setting the field of the trigger frame to one of the sequences in the set {11111111110, 11111011110, 01111111110}.

13. A non-transitory machine-readable storage medium having stored thereon processor-executable instructions, which when executed by a processor of a device, cause the device to implement a method according to claim 11.

14. A non-transitory computer program product comprising a computer-readable storage medium having computer-readable instructions stored thereon, the computer-readable instructions being executable by a device comprising processing hardware to execute a method according to claim 11.

* * * * *